TELEPHONE SUBSTATION MINIATURIZATION CIRCUIT

Filed Nov. 27, 1964

Giorgio Dal Monte,
Pasquale Postorino
INVENTORS

BY Irvin S. Thompson
ATTORNEY

United States Patent Office 3,404,238
Patented Oct. 1, 1968

3,404,238

TELEPHONE SUBSTATION MINIATURIZATION CIRCUIT

Giorgio Dal Monte and Pasquale Postorino, Milan, Italy, assignors to Società Italiana Telecomunicazioni Siemens S.p.A.

Filed Nov. 27, 1964, Ser. No. 414,348
Claims priority, application Italy, Nov. 27, 1963, 24,177/63
4 Claims. (Cl. 179—81)

ABSTRACT OF THE DISCLOSURE

A telephone set having a pair of line terminals and an anti-side tone hybrid coil connected to the terminals with condensers on the opposite line sides of the coil, a microphone connected to one line terminal and to a tap of the hybrid coil windings, and a high-impedance second coil connected to the other line terminal and the tap. The hybrid coil has a magnetic core without air gap and the second coil has a magnetic core with air gap, permitting miniaturization of the set.

This invention relates to telephony, and more particularly to a telephone substation circuit compatible with miniaturization of telephone substations wherein the volume and weight required for a subscriber's set is reduced.

It is well known that the micromodule technique permits the reduction in the size of components used in a subscriber's set thereby improving efficiency in both transmission and reception. New circuits are required to meet the demand for reducing the dimensions of telephone sets encompassing miniature components.

The essential features of the present invention comprise modification of the standard electric circuit of a subscriber's set to adapt the same to miniaturization.

The principal object of this invention is to provide a novel circuit compatible with the miniaturization of a telephone substation set.

Another object is to provide a telephone substation set circuit wherein the differential transformer magnetic circuit does not include an air gap whereby the weight and volume of the same may be greatly reduced.

Still another object is to provide a telephone substation set circuit wherein the transmitter exciting current does not flow through the windings of the transformer.

Yet another object is to provide a telephone substation set circuit wherein a second high-inductance coil having an air gap, separate from the differential transformer, presents a high impedance to line audio currents.

Still yet another object is to provide a telephone substation set circuit having capacitors to block the line direct current from circulating through the differential transformer and the transmitter.

Other objects and advantages will clearly appear from a description of a preferred embodiment as shown in the accompanying drawing, in which.

Similar reference characters are applied to similar elements throughout the drawing.

Figure 1:
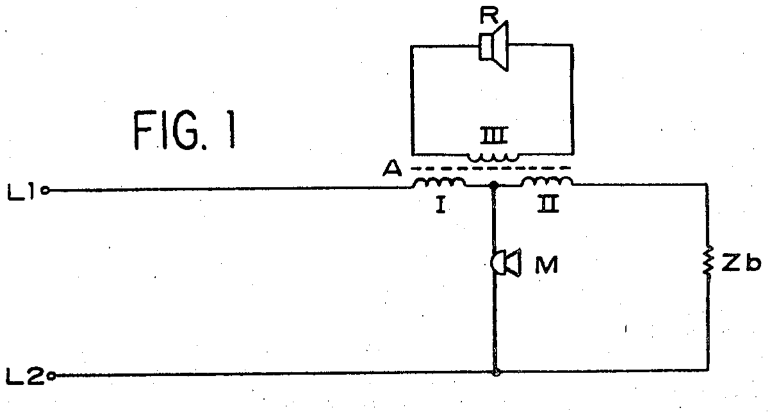
FIG. 1 shows a simplified standard circuit for a subscriber's set.

Turning now to FIG. 1 showing a standard circuit of a subscriber's set, L1, L2 are the terminals connected to a two-wire line from a central exchange. The remaining elements are conventionally found in an anti-side tone four-wire circuit and comprise a transmitter M, the receiver R, the terminal impedance Zb, and the windings I, II, III of the differential induction or hybrid coil A. Normally the mid-tapped windings I and II carry the transmitter M current. When the subscriber's line is short, the circulating current rises to a high value. To avoid power losses in the resistance, the wire of windings I and II is usually increased in size and in the number of turns with an additional purpose of obtaining the correct value of inductance for circuit matching. The magnetic core is provided with an air gap which necessitates a coil or transformer A of considerable size and weight.

Figure 2:
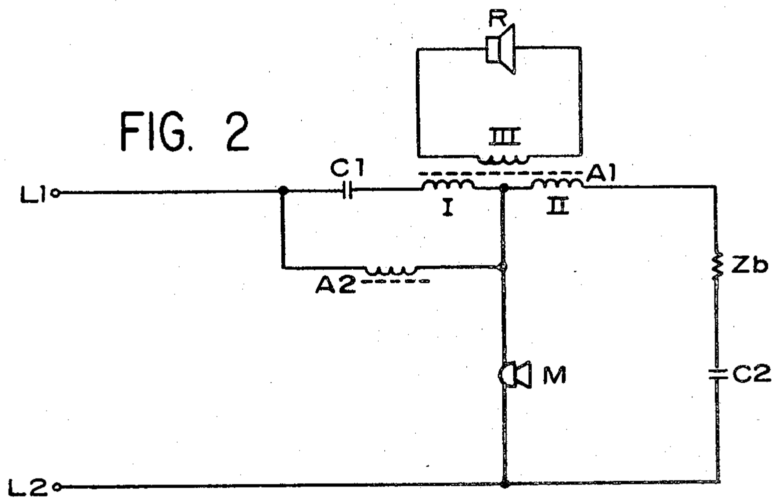
FIG. 2 illustrates the novel circuit of this invention.

FIG. 2 illustrates circuit elements whereby the usual size and weight thereof may be greatly reduced and thereby permit miniaturization. The differential or hybrid coil A1 with windings I, II, and III does not have an air gap, and in addition the exciting current of the transmitter is not permitted to flow through windings I and II by the use of blocking capacitors. The hybrid coil A1 still performs the usual circuit functions including that of the anti-side tone function. Hence, the required impedances of coil A1 are obtained with fewer turns of wire and also the wire may be of a smaller size.

A second coil A2 having an air gap is provided having a higher inductance than winding I. Coil A2 presents high impedance to audio currents generated by the transmitter M so that much of the audio currents flow through the winding I and the line terminals L1 and L2. Coil A2 is still smaller than coil A1 since it carries only one winding. Isolating capacitors C1 and C2 prevent direct current from terminals L1, L2 from circulating through transmitter M or the hybrid coil or differential transformer A1.

From the foregoing description it will be apparent that the size and weight of the conventional subscriber's substation set may be greatly reduced primarily by the use of isolating capacitors and by the provision of a hybrid coil magnetic circuit without an air gap whereby the winding turns, wire gauge, and magnetic core size may be reduced.

While for purposes of description, a specific embodiment of this invention has been shown and described, it will be apparent that changes and modifications can be made therein without departing from the spirit of this invention or the scope of the appended claims.

Having described our invention, we claim:

1. In a telephone set, a pair of line terminals, an anti-side tone hybrid coil connected to said terminals through condensers which block the direct current from crossing said hybrid coil, a microphone, a high-impedance second coil carrying the direct current to the microphone, said microphone being connected to one terminal of the line and to a tap of the hybrid coil windings.

2. A telephone set according to claim 1 in which said hybrid coil is provided with a magnetic core without air gap and said high-impedance coil is provided with a magnetic core with air gap.

3. A telephone set comprising a pair of line terminals, an anti-side tone hybrid coil, condensers through which said coil is connected to said terminals to avoid direct current across said coil, a microphone connected to one said terminal and to a tap of said hybrid coil, and a high-impedance second coil connected to the other said terminal and said tap in parallel with the series combination of a winding of said hybrid coil and one of said condensers.

4. A telephone set as claimed in claim 3, said hybrid coil having a magnetic core without air gap and said second coil having a magnetic core with air gap.

References Cited

UNITED STATES PATENTS 2,775,649 12/1956 Pocock et al. -------- 179—81

FOREIGN PATENTS 671,784 5/1952 Great Britain.
1,036,929 8/1958 Germany.
232,543 2/1959 Australia.

KATHLEEN H. CLAFFY, *Primary Examiner.*

R. LINN, *Assistant Examiner.*